(12) United States Patent
Ranade

(10) Patent No.: US 8,397,084 B2
(45) Date of Patent: Mar. 12, 2013

(54) SINGLE INSTANCE STORAGE OF ENCRYPTED DATA

(75) Inventor: Dilip Madhusudan Ranade, Kothrud (IN)

(73) Assignee: Microsoft Corporation, Redmond, WA (US)

( * ) Notice: Subject to any disclaimer, the term of this patent is extended or adjusted under 35 U.S.C. 154(b) by 565 days.

(21) Appl. No.: 12/138,402

(22) Filed: Jun. 12, 2008

(65) Prior Publication Data

US 2009/0313483 A1    Dec. 17, 2009

(51) Int. Cl.
G06F 11/30    (2006.01)
G06F 12/14    (2006.01)

(52) U.S. Cl. .......................... 713/193; 705/52
(58) Field of Classification Search .................... 713/193
See application file for complete search history.

(56) References Cited

U.S. PATENT DOCUMENTS

| | | | |
|---|---|---|---|
| 6,389,433 B1 | 5/2002 | Bolosky et al. | |
| 6,513,051 B1 | 1/2003 | Bolosky et al. | |
| 6,931,549 B1* | 8/2005 | Ananda ........................... | 726/26 |
| 7,043,637 B2 | 5/2006 | Bolosky et al. | |
| 7,266,689 B2 | 9/2007 | Douceur et al. | |
| 7,398,283 B2* | 7/2008 | Margolus et al. ...................... | 1/1 |
| 7,657,931 B2* | 2/2010 | Margolus et al. ................. | 726/6 |
| 7,685,096 B2* | 3/2010 | Margolus et al. ............ | 713/165 |
| 8,041,641 B1* | 10/2011 | Panchbudhe et al. ........... | 705/52 |
| 8,099,550 B1* | 1/2012 | Madnani et al. ............... | 711/114 |
| 2006/0005048 A1 | 1/2006 | Osaki et al. | |
| 2006/0129847 A1* | 6/2006 | Pitsos .......................... | 713/193 |
| 2006/0224846 A1 | 10/2006 | Amarendran et al. | |
| 2006/0235908 A1 | 10/2006 | Armangau et al. | |
| 2006/0236406 A1 | 10/2006 | Johnson | |
| 2007/0056047 A1 | 3/2007 | Claudator et al. | |
| 2008/0104146 A1* | 5/2008 | Schwaab et al. ............... | 707/204 |
| 2009/0138728 A1* | 5/2009 | Fujiwara et al. ............... | 713/193 |

OTHER PUBLICATIONS

Douceur, et al., "Reclaiming Space from Duplicate Files in a Serverless Distributed File System", Microsoft Research Technical Report, Jul. 2002, pp. 14.
Randall, et al., "Deploying the Tivoli Storage Manager Client in a Windows 2000 Environment", International Technical Support Organization, Apr. 2001, International Business Machines Corporation, pp. 190.
Adya, et al., "FARSITE: Federated, Available, and Reliable Storage for an Incompletely Trusted Environment", Appears in 5th Symposium on Operating Systems Design and Implementation (OSDI 2002), Dec. 2002, pp. 1-14.
Bolosky, et al., "Feasibility of a Serverless Distributed File System Deployed on an Existing Set of Desktop PCs", Proceedings of the International Conference on Measurement and Modeling of Computer Systems, vol. 28, No. 1, Jun. 2000, ACM SIGMETRICS Performance Evaluation Review, pp. 10.
Cooley, et al., "ABS: The Apportioned Backup System", MIT 6.824 Final Project, 2004, pp. 1-10.

* cited by examiner

Primary Examiner — Kambiz Zand
Assistant Examiner — Dant Shaifer Harriman

(57) ABSTRACT

Described is a technology by which data is efficiently and securely stored in a single instance store. A hash value is computed from data in its unencrypted form. The hash value is used to reference a single instance of that data when stored in its encrypted form. In this manner, duplicate data blocks are detectable independent of their encryption, yet stored in an encrypted form in a single instance store. In one aspect, context information for decrypting the encrypted data is stored in association with the data. When the client wants to restore the data, the client sends the hash value for that block to the single instance store service. The service returns the block and the associated context information. The client uses the context information to decrypt the block. For example, the context may comprise a key identifier which the client uses to lookup the correct key.

20 Claims, 8 Drawing Sheets

SINGLE INSTANCE STORAGE OF ENCRYPTED DATA

BACKGROUND

Single instance storage (SIS) is a technique to increase data storage utilization by detecting duplicate data blocks in a set of data blocks, and then storing only one instance of a duplicate data block, and using a reference to point to the original single instance copy of the data. Duplicate blocks, which are fairly common, are identified by computing a checksum (e.g., signature/hash) of the data, and storing the checksum, data pair in some form of a lookup table. As can be readily appreciated, not only is storage space reduced by single instance storage, but in networking scenarios, overall network traffic may be reduced by avoiding the need to transfer another copy of already stored data over the network.

In the context of data backup as a service, or data archival as a service (or any other service that stores a customer's data), the owner of the backed-up data may often want to keep the data confidential from the service provider, such as for business secrecy or for regulatory compliance reasons. In such scenarios, the data to be stored first needs to be encrypted at the customer's site so that it is secure in transit over the network and when stored at the service provider's storage systems.

At the same time, the principle of layered security requires that data not be encrypted with a single key, so that a breach of one key does not compromise all of the data. Further, with time, methods of encryption, key lengths, and so forth often change. One result is that the same block of data encrypted and transferred to storage at different times and/or from different sources will often have a different encrypted form.

As a consequence, single instance storage and data encryption do not work well together. More particularly, because the encryption process "randomizes" the data bits to an extent, it is very unlikely that two encrypted data blocks of any data set will be identical to one another when processed into their encrypted forms. Thus, a service provider obtaining a set of encrypted data blocks generally cannot perform single instancing without decrypting the data, which is undesirable and often not allowed by clients.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a hash value that is computed from a hash of data in its unencrypted form is used to reference a single instance of that data stored in its encrypted form. In this manner, the duplicate data blocks are detectable independent of their encryption, yet stored in an encrypted form in a single instance store.

In one aspect, encrypted data is stored in association with context information that may be used to decrypt the encrypted data, without enabling the single instance storage service to decrypt the encrypted data. For example, the context data may include a reference to a key, in which the reference is maintained in association with the key at a client-side location that is only accessible to the client.

In one aspect, when the client wants to store an encrypted block of data, the client sends a hash value of that data (computed when unencrypted) to the single instance store service. If the server has an instance of that data as identified by the hash value, the server does not request the encrypted data block thereby saving network traffic. If the server does not have an instance of that data, the server requests it; in response, the client provides the encrypted data block, along with any context information needed to later decrypt the data block. It should be noted that the context information may not contain the decryption key, but only contain an identifier (or descriptor) to the key such that only the client can acquire the correct key. For example, by using the key identifier to locate the key in a database accessible only to the client. Alternatively, the decryption key may be present in the context but itself encrypted with another key.

In another aspect, when the client wants to restore a block of data from the store, the client sends the hash value for that block to the single instance store service. The service returns the block, along with any associated context information that may be used to decrypt the block. The client uses the context information as appropriate to decrypt the block. For example, the context may comprise a key identifier which the client then uses to lookup the correct key, such as in a secure database available only to the client.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards leveraging the single instance storage technologies to be used with encrypted data, thereby obtaining the advantages of SIS technology without revealing the unencrypted data (and/or the decryption key) to the site hosting the SIS store. In general, this is accomplished by obtaining a hash value/checksum/signature of data (e.g., a plaintext data block) prior to its encryption, and using that hash value to identify the encrypted data. The data is then encrypted and stored. By maintaining appropriate context in association with the encrypted data, the data may later be decrypted at the client.

In general, as used herein the terms "hash," "hash value," "checksum," and "signature" each essentially mean the same thing with respect to data, namely a way to numerically represent the contents of a data set (e.g., block) that is the same for an identical data set, and distinct from the numeric representation of the contents of any non-identical data set. Also, the term "block" with respect to a unit of data storage may be any amount of data. For example, one simple SIS method may use fixed size data blocks as the unit of single instancing. Alternatively, a block may be a variable sized data chunks, e.g., one chunk may be as large as a whole file or document, while another may be much smaller than a disk block. The term "block" thus covers both variable and fixed size data chunks, of any useable size.

While some of the examples described herein are directed towards data backup to a remote service, any use of single instancing technology may benefit from the various aspects described herein. Further, while key-based encryption of data blocks is described, any mechanism for obscuring data may be used, as well as any data structure for holding data, e.g., file, cluster, allocation unit and so forth. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data storage in general.

Turning to the drawings, as described herein, in general SIS can be made to work in a backup/archive service with encrypted data blocks by modifying the client and service provider, e.g., via protocols at the client and service provider. As will be understood, the client and service provider cooperate in a way such that with relatively very little overhead, identical blocks of data are stored as a single instance even though that stored instance is encrypted.

Figure 1:
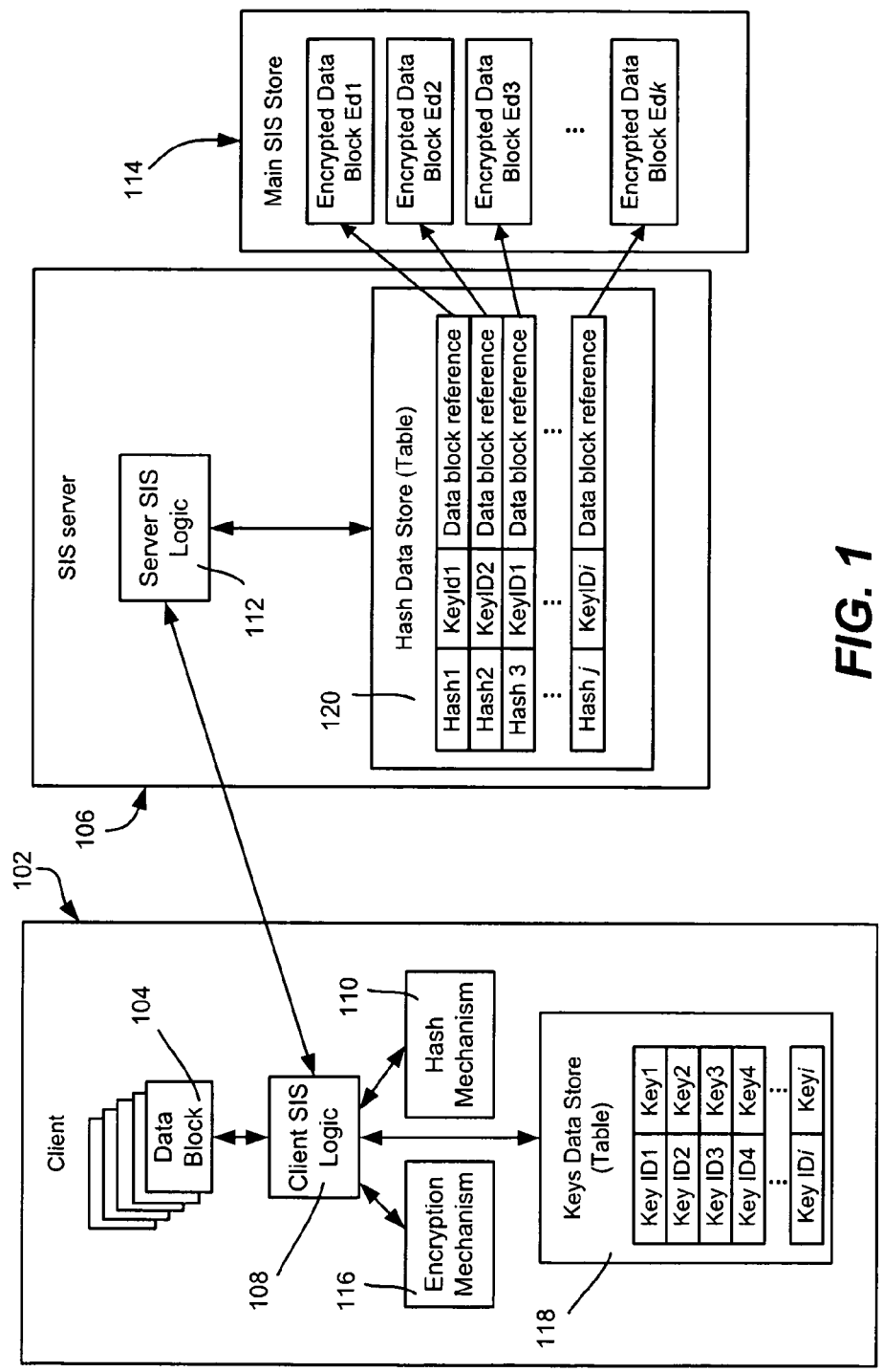
FIG. 1 is a block diagram representing an example client and server environment in which encrypted data is stored in a single instance store.

As generally represented in FIG. 1, a client 102 that wants to store an encrypted data block 104 (e.g., of a set of blocks) computes and sends an identifier (ID) of the data block along with hash value representing the original (unencrypted) data block to the service provider, represented by a SIS server 106. In FIG. 1, this computation and communication is represented by the client SIS logic 108, the hash mechanism 110, and the server SIS logic 112. The hash value that is sent is not encrypted, or alternatively may be encrypted as long as the service provider has a key and can thus read the hash value.

As described below, the server uses the hash value to determine whether the data block already has an instance of it stored in encrypted form in a main SIS store 114, (which may be directly or indirectly coupled to and/or incorporated into the server 106). If so, there is no need to store another copy, whereby the client 102 is informed of this by the server 106, and associates this data block's identifier with its hash value so the client 102 can later retrieve the data block from the server as desired via that hash value, as described below. For example, each data block may have a hash associated with it.

In the event the server 106 does not yet have a data block instance saved with this hash value, the server 106 requests the data block from the client 102. In one example implementation, the client 102 encrypts the data block via an encryption mechanism 116 and sends the encrypted data block as part of a package sent to the server 106.

More particularly, in an example implementation, the encrypted data of the data block is packaged in a "self-identifying" format comprising the encrypted data and some associated context, which for example may include a reference to the encryption key, the encryption method that was used, and so forth. The context is typically such that a secure computer at the client site may successfully decrypt the data block without needing any additional context. The context itself may be encrypted using another key that is available to the secure client computer. As described below, the client 102 maintains the ability to interpret the context. For example, if the client sends a reference (KeyID) to the encryption key to the server 106 as the context, the client maintains that reference in association with the encryption key, e.g., in a {KeyID, Key} pair in a keys data store 118. Note that the KeyID may instead be a context identifier by which the client can obtain the key and any other context locally, e.g., in a {ContextID, context data} pair where the key is within the context data. If the context is encrypted and the key used to encrypt the context may change, the context encryption key may be maintained as well, e.g., in a {ContextID, data block encryption key, context key} triplet; (note however if the context is encrypted, the data block encryption key may be maintained within the context data that is sent to and returned by the server 106, since the server will be unable to read the context).

In this manner, without revealing the encryption key, when the encrypted data block and context is returned to the client, the client can determine which key of possibly many keys was used to encrypt that data block, (as well as determine the type of encryption that was used, if necessary, along with any other desired context that was saved). Note that as mentioned above, the context may be encrypted and contain the data block decryption key, whereby the referenced key may be the key used to decrypt the context and get the data block decryption key.

The SIS technique can be used at the service provider based on the hash value of the original data block, with the service provider storing only one self-identifying data block plus possibly some context per identical block of data. Indeed, if the same key is used and the context never changes, there need not be any context, whereby the SIS server 106 merely needs to single instance store and retrieve the encrypted data block/ package based on the hash value. However, multiple keys are desirable in most scenarios, and thus some context is likely present.

Note that as represented in FIG. 1, instead of (or in addition to) storing the encrypted data block in the hash data store, the encrypted data block may be stored separately from the hash data store 120 (e.g., table) that maintains the context as indexed by the hash value. To this end, the encrypted data block is referenced by a pointer that is also indexed by the hash value, e.g., via a "Data block reference" in the hash data store 120.

Figure 2:
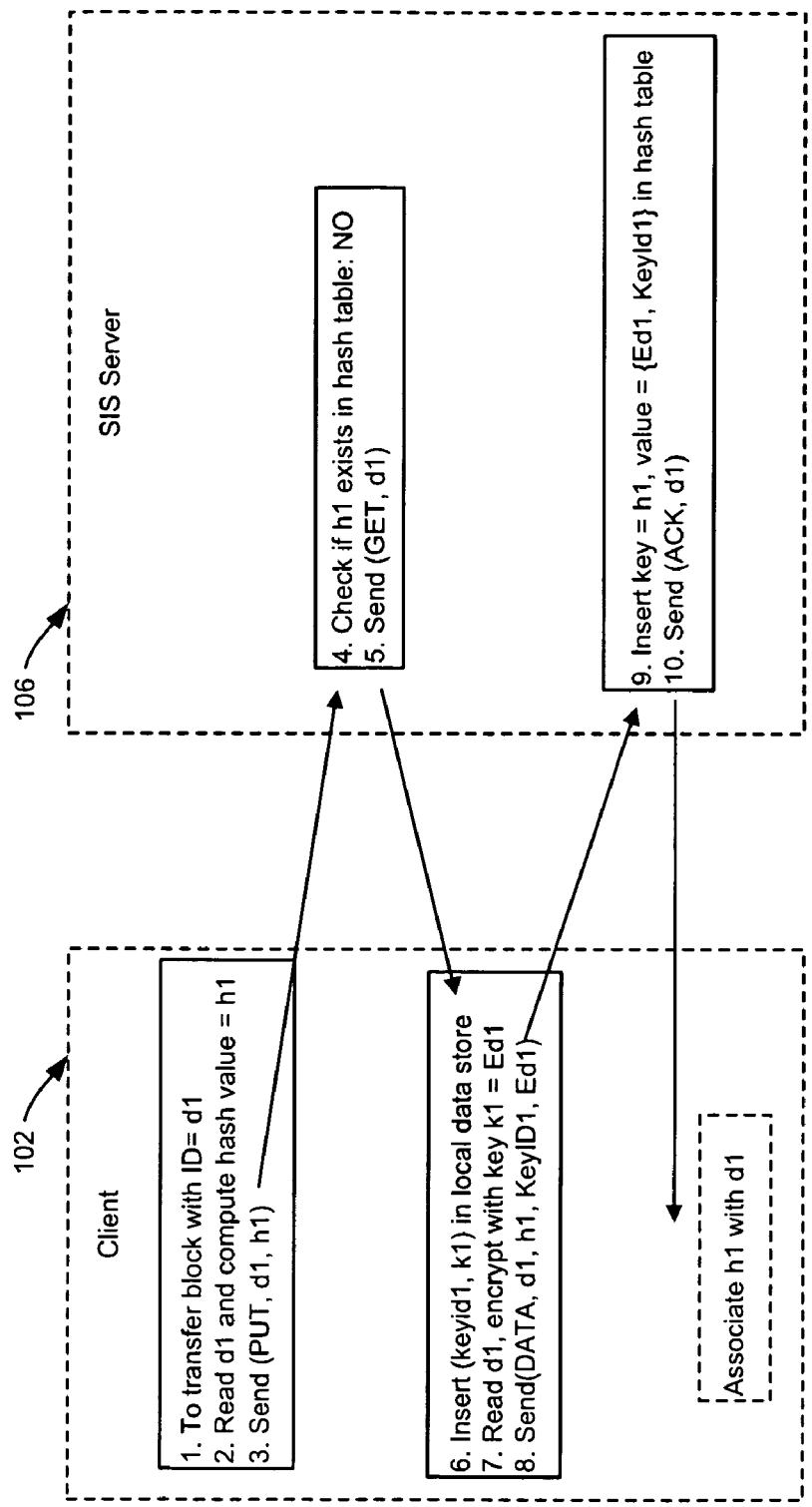
FIGS. 2 and 3 are representations of example operations and messages exchanged between a client and server to handle encrypted data storage in a single instance store.
Figure 3:
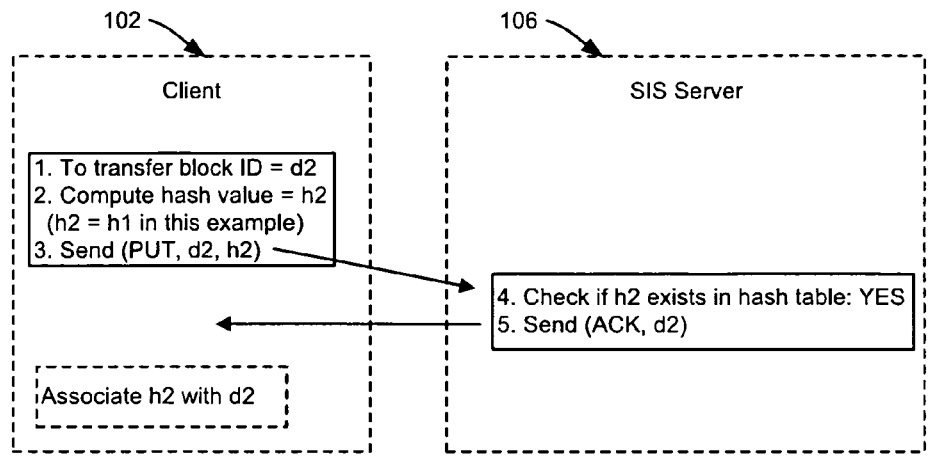
Figure 4:
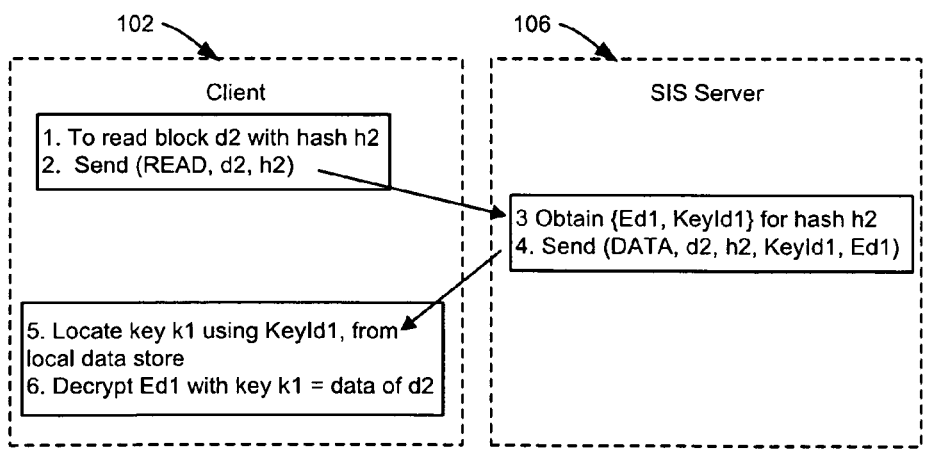
FIG. 4 is a representation of example operations and messages exchanged between a client and server to retrieve encrypted data stored in a single instance store.

FIGS. 2-4 show example protocols for client and server communication and operation; in FIGS. 2-4, the protocol messages are capitalized, e.g., "PUT" and so forth. FIGS. 5-8 show example client and server operations based on storage/ backup (FIG. 5, client and FIG. 6, server) and reading back/ restore (FIG. 7, client and FIG. 8, server) actions.

Figure 5:
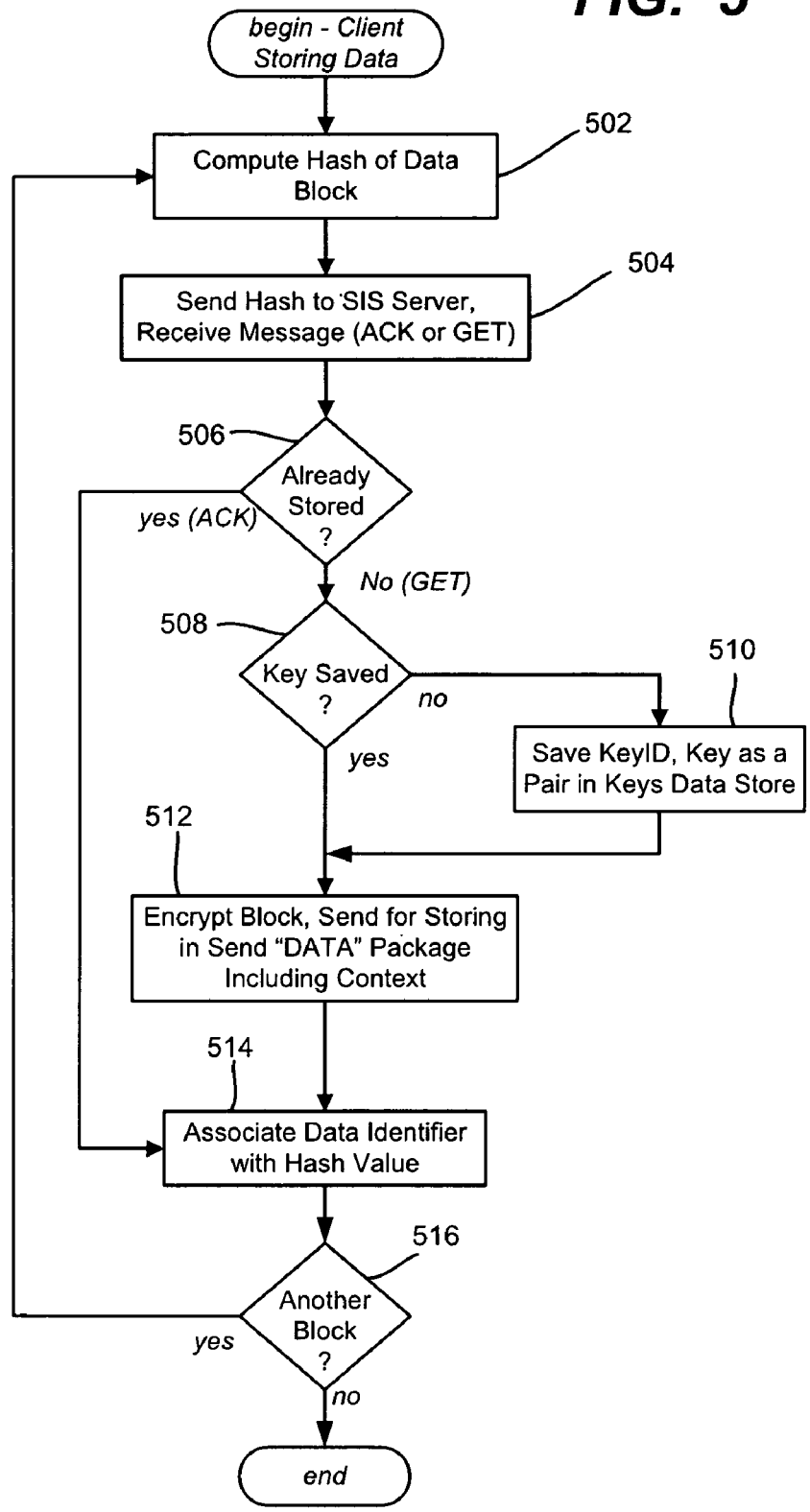
FIG. 5 is a flow diagram showing example steps taken by a client when storing encrypted data in a single instance store.
Figure 6:
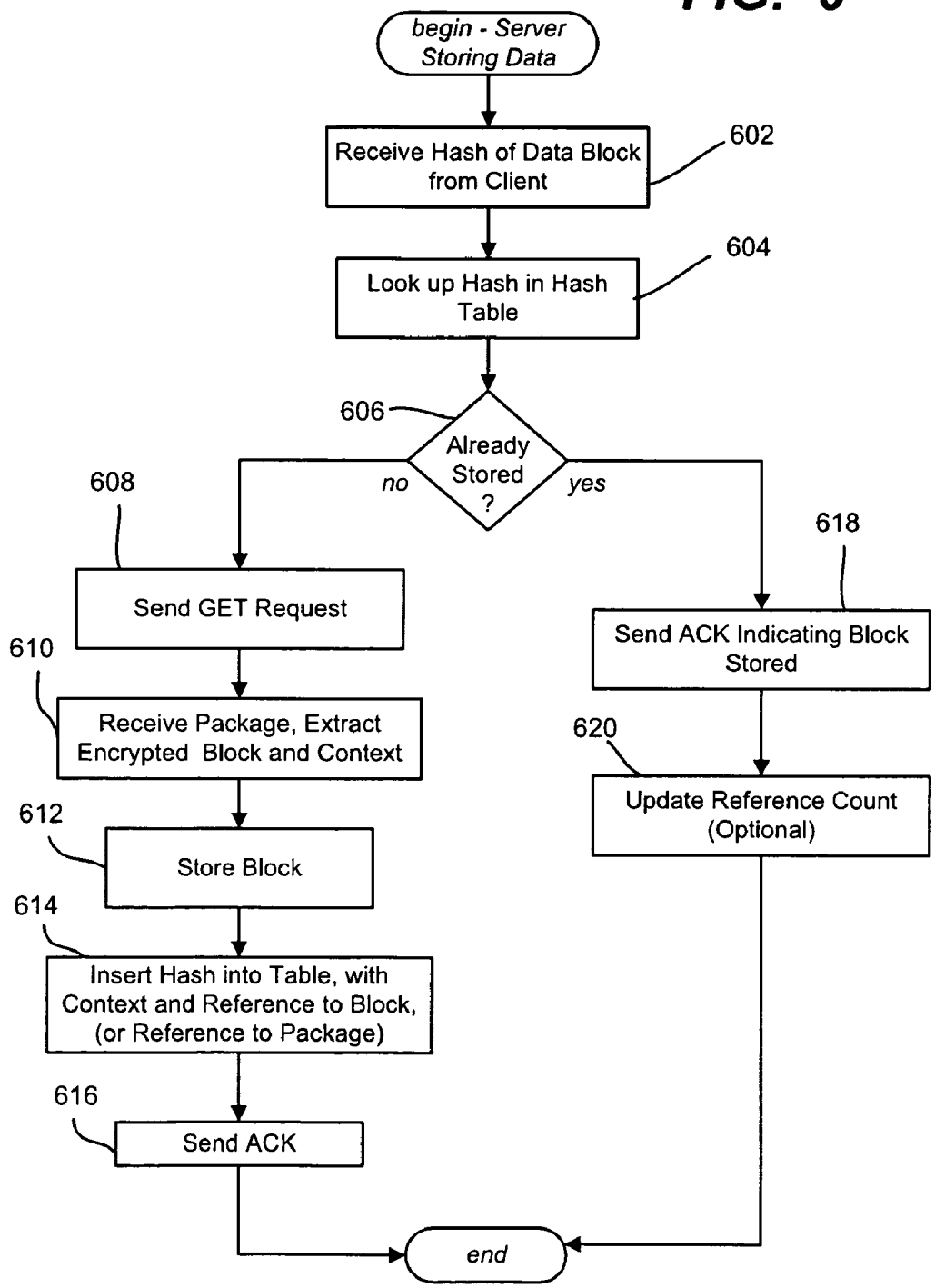
FIG. 6 is a flow diagram showing example steps taken by a server when storing encrypted data in a single instance store.
Figure 7:
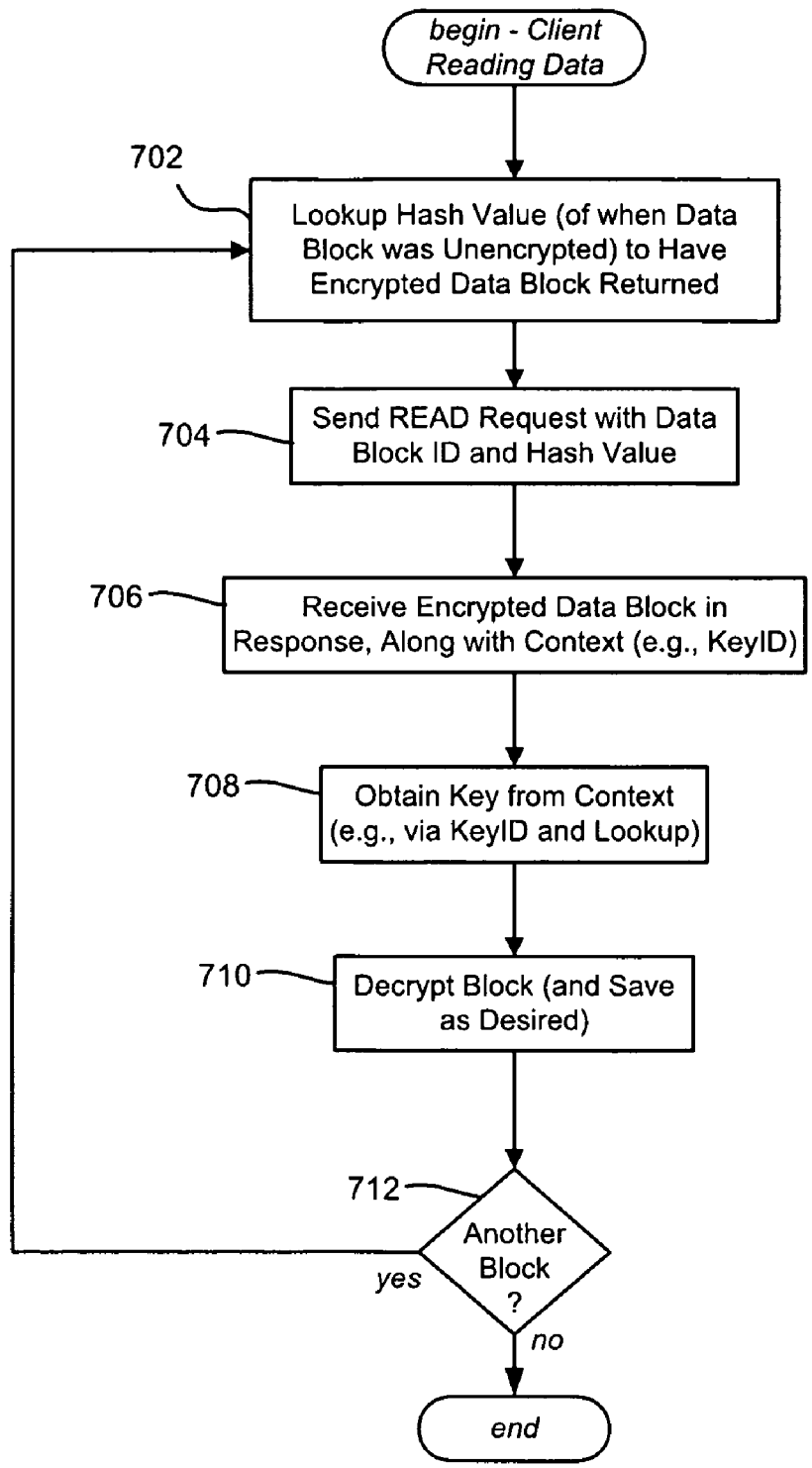
FIG. 7 is a flow diagram showing example steps taken by a client when retrieving encrypted data from a single instance store.
Figure 8:
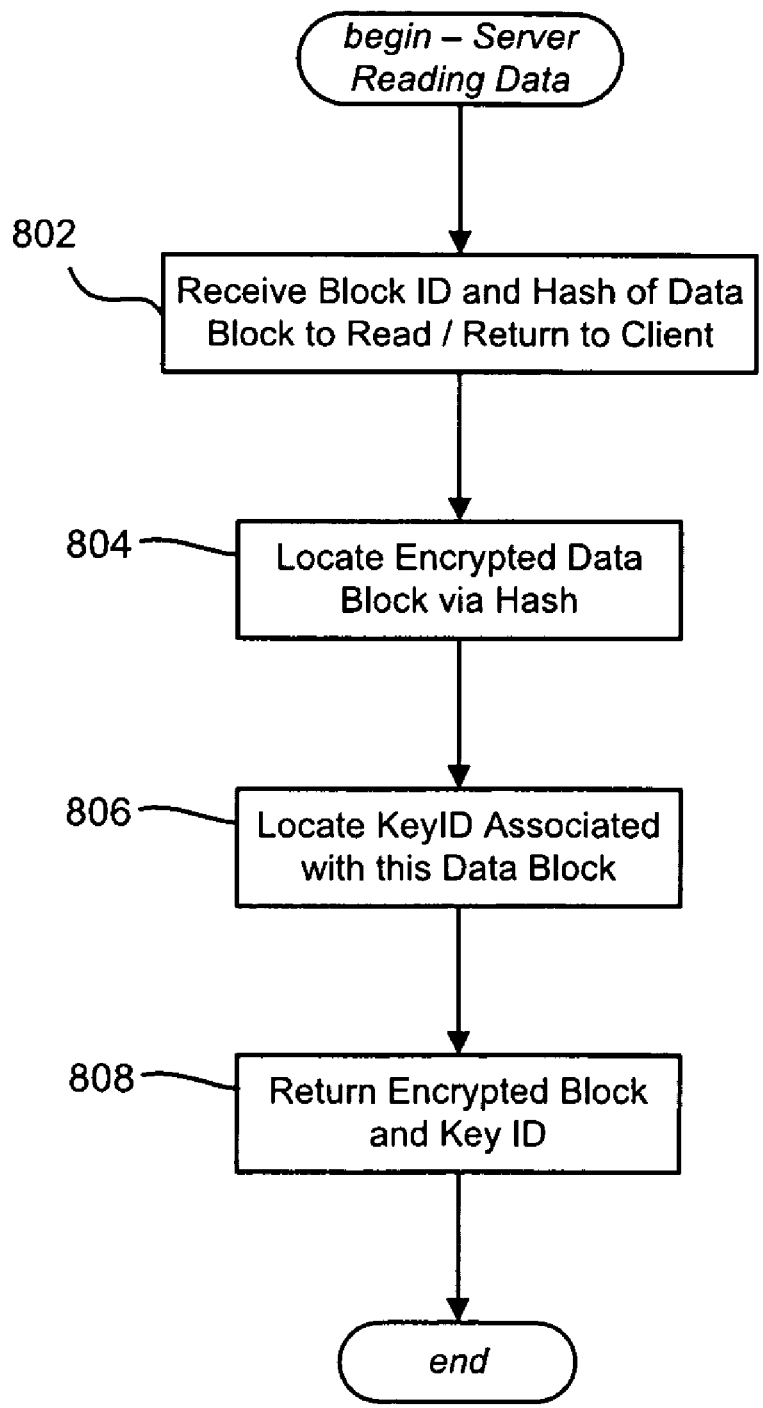
FIG. 8 is a flow diagram showing example steps taken by a server when retrieving encrypted data from a single instance store.

In the example of FIGS. 2, 5 and 6, the client 102 wants to have a block of data, identified by d1 as an identifier, stored by the server 106 in a SIS store in encrypted form. To this end, the client reads d1 and computes its hash (h1), and sends the hash to the server along with the d1 identifier in a "PUT" message requesting the server operation. This is also represented by step 502 of FIG. 5.

In this example, the server 106 receives the hash value (step 602 of FIG. 6), checks whether it has a data block instance already stored for the h1 hash value, and determines that it does not (steps 604 and 606). The server 106 responds with a "GET" message in FIG. 2 and at step 608 of FIG. 6 requesting the d1 data block. Note that the d1 identifier is exchanged with each such message, so that, for example, the client and server can distinguish between multiple messages for different data blocks in parallel.

As represented in FIG. 2 and in FIG. 5 via steps 506 and 508, the client responds to the "GET" message by maintaining a copy of the data block key (or context and/or context key) in association with a reference thereto (key identifier) in its local data store. In other words, the client stores information locally that will allow successful decryption of encrypted data block given the context. Although FIG. 2 shows the key as being inserted, it is understood that the key only needs to be inserted if it is a new key/reference that does not already exist in the keys data store 118; a key and its KeyID reference may be reused many times if desired. If it already is entered at step 508, then the existing KeyID and corresponding key may be retrieved and reused, otherwise the pair is inserted at step 510 and the key used to encrypt the data block.

At step 512, the client 102 encrypts the block with the key and sends a package to the server 106 that contains the encrypted data block plus a description of how it was encrypted (that is, the context, such as the KeyID in this example). Step 514 represents associating the data block with the hash value, e.g., the client persists (e.g., in a suitable data structure) the data block identifier d1 with its hash value h1 so that the corresponding encrypted data block can be later retrieved via its hash value of the unencrypted data, (similar to standard SIS operations). Step 516 represents repeating the process for another data block, if any.

When the server receives this DATA message (step 610 of FIG. 6), the server stores the encrypted data block Ed1 (step 612) and inserts the h1 hash value into its hash table (step 614), along with a reference pointer (e.g., path and/or URL) to the encrypted data block (as in FIG. 1) and the context, which in the example of FIG. 1 is only the key identifier KeyID1. Alternatively, the server may store the encrypted data block directly in the hash data store, e.g., as a column of a database table.

The server then sends an acknowledgement "ACK" message to the client in response to the client's "DATA" message. This message indicates that storage of the encrypted data and key identifier corresponding to the d1 data block is complete, as represented by step 616. This step is optional (e.g., with reliable message transmission).

FIG. 3, along with FIGS. 5 and 6, shows an example of the protocol when the hash value indicates that an instance of the data block is already stored by the server. In this example, a data block d2 is the same as the data block d1 when both are unencrypted, and thus their hash values are the same, that is, h2 equals h1. In this event, the d2 "PUT" message is not responded to with a "GET" message by the server (following step 606), but rather with a d2 "ACK" message (step 608) because the server locates an already-maintained hash value in the hash data store that matches the one sent. No further action need be taken, although the server may increment a reference count or the like (optional step 620) and at step 514 of FIG. 5 the client associates the data block identifier d2 with its hash value h2 (or with h1 as another entry therewith) so that the corresponding data can be later retrieved via its hash value. For example, the hash value may be indexed by the data block, e.g., (d1: h1; d2: h1), and/or each hash value may have a number of data blocks, e.g., (h1: d1, d2). Note that network traffic is substantially reduced in this situation because only the hash key (h2) is sent and acknowledged; the acknowledgement indicates that the data block is already stored, whereby the encrypted data block is not transferred.

FIG. 4 (along with FIGS. 7 and 8) represents the protocol when reading back data; in this example, the client 102 wants to receive the encrypted data block and key identifier associated with the data block identifier d2. A "READ" message for D2 is thus sent from the client 102 to the server 106, along with the hash value that the client previously maintained in association with d2. Steps 702 and 704 represent these client actions.

The server 106 receives the request (step 802) and responds by using the hash value (h2, the same value as stored with h1) to locate the encrypted data block (Ed1) and the key identifier (KeyID1), as represented by steps 804 and 806. A "DATA" message returns the package comprising the encrypted data block and the context (the KeyID1 in this example) to the client 102, as represented by step 808.

Returning to FIG. 7, step 706, with the information received in the "DATA" message, the client locates the data block encryption key (or context encryption key) from which the original data block may be decrypted from the encrypted block Ed1 (steps 708 and 710). In other words, the client reads the context within the package and uses the context to decrypt the data block, such as by looking up the key as indexed by the KeyID in the context. The data may be restored by the client as desired, e.g., buffered for combining with other data, written to disk, and so forth. The client 102 thus has the data back in unencrypted form, from a single instance storage of the data in encrypted form, regardless of how originally encrypted, without having revealed the key to the server 102. Step 712 represents restoring other blocks, if any.

Turning to another aspect, the process of packaging of encrypted data with context information may be nested. That is, the encryption used on the context may itself require another context descriptor. One motivation for this is that typically, one set of data blocks being transferred in a single session is encrypted with a unique session key. There may be millions of such sessions, whereby it is impractical to store all these millions of session keys at the client. Instead, the context may contain the session key itself, with the session key encrypted with another key. An example is set forth below:

E(k,p) means k is encrypted using key p,
K1=session key
P1=key of administrator having admin-id1; similarly for P2.
Context={admin-id1, E(K1,P1), admin-id2, E(K1, P2), hash}

When the above context is sent back to the client along with the encrypted data block, the client only needs to be able to find one of the keys, P1 or P2, to be able to extract the session key K1 and thereby to decrypt the data block. Note that the client does not need to store k1 locally. The set of keys {P1, P2, . . . } are ordinarily much smaller than the set of session keys.

In the examples above, the client may be considered as an individual data source that encrypts the data and sends it directly to the service provider, by cooperating or use a coordinating node that stores the keys. In an alternative scenario, the above-described technology also applies in a scenario where a single computer (or a small number of computers) such as an appliance on a client site funnels in the data from a large number of data sources, such as workstations or networked computers. The client site appliance (for example) performs the encryption operations as described above, and then sends the data to the service provider using the SIS protocol. Similarly, the appliance can decrypt the data coming back from the provider. In this manner, the possibly numerous data sources need not deal with encryption, decryption and/or key storage, yet the data never leaves the client site in an unencrypted form.

Exemplary Operating Environment

Figure 9:
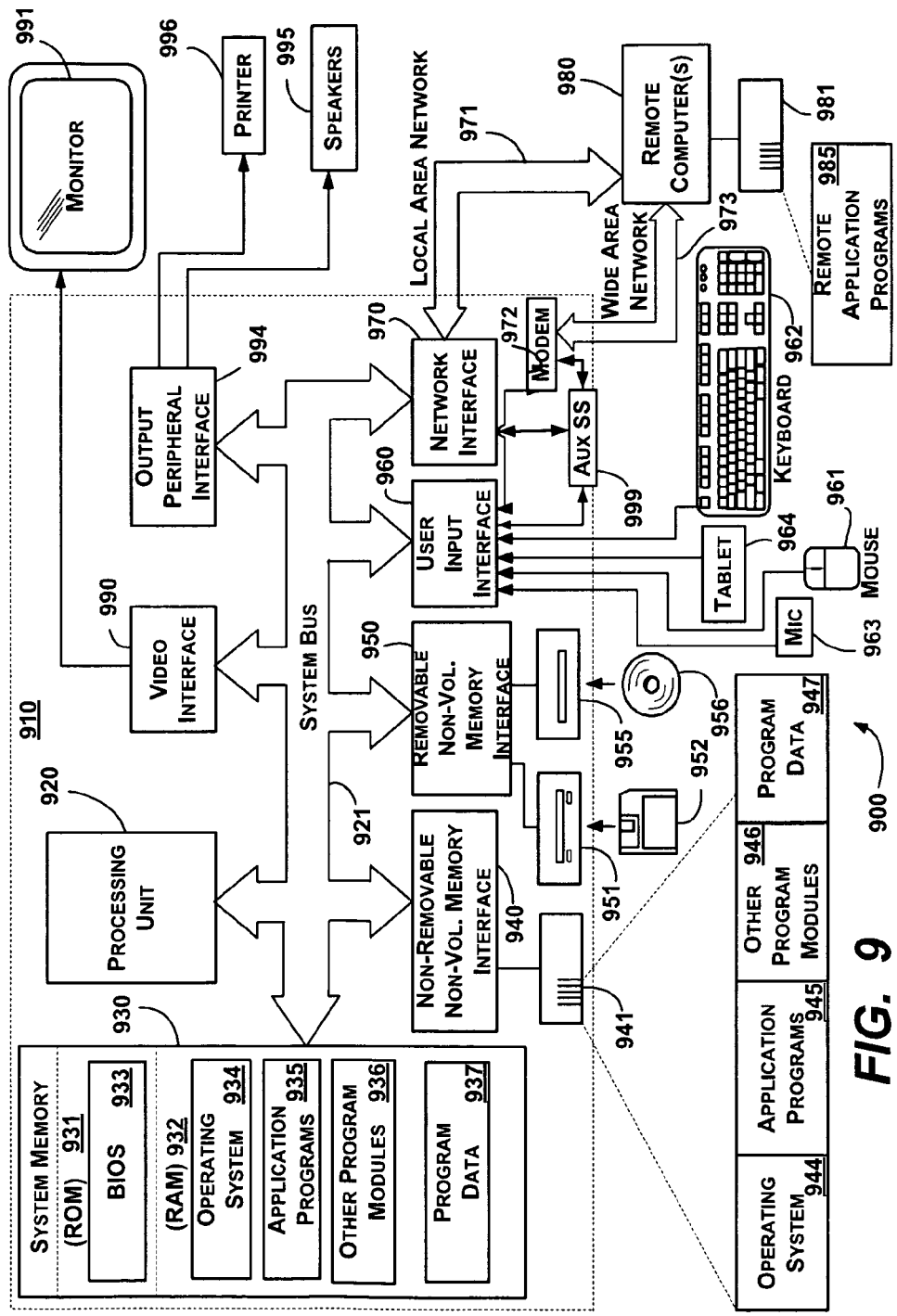
FIG. 9 shows an illustrative example of a computing environment into which various aspects of the present invention may be incorporated.

FIG. 9 illustrates an example of a suitable computing and networking environment 900 into which the examples of FIGS. 1-8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing machine in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946 and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing machine 910 is incorporated, such as in a tablet-type personal computer. In addition, computers such as the computing machine 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component 974 such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are exemplary and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   receiving at a server and from a client, a hash value computed by the client from a hash of data in its unencrypted form located at the client;
   maintaining, at the client, a key identifier (ID) and an encryption key in a keys data store, the encryption key for encrypting and decrypting the data, and the key ID indexing the encryption key in the keys data store;
   determining, by the server, from the hash value whether an instance of the data in an encrypted form corresponding to the unencrypted form is already stored at the server;
   in response to determining from the hash value that an instance of the data in an encrypted form corresponding to the unencrypted form is already stored at the server, returning an acknowledgement to the client indicating that the instance is already stored; and
   in response to determining from the hash value that an instance of the data in an encrypted form corresponding to the unencrypted form is not already stored, returning a message to the client indicating that the instance is not already stored, receiving from the client an instance of the data in an encrypted form along with the key ID, and storing, at the server, the instance of the data in the encrypted form and the key ID in association with the data in the encrypted form,
   wherein at least one of the receiving, maintaining, determining, returning and storing steps is performed by a processing unit.

2. The method of claim 1 further comprising, receiving the data in the encrypted form from the client in a communication separate from a communication of the hash value.

3. The method of claim 2 further comprising, receiving, at the server and from the client, the hash value in association with a request to return data, and in response, returning the encrypted form of the data and the key ID to the client.

4. The method of claim 1 further comprising, providing the hash value to the server and in response, receiving the encrypted form of the data at the client.

5. In a computing environment having a single instance store service located at a server for storing data received from a client, a system comprising:
   a hash mechanism located at the client;
   an encryption mechanism located at the client;
   client logic located at the client, the client logic coupled to the hash mechanism to obtain a hash value of a data block prior to encryption of that data block for storage, and coupled to the encryption mechanism to process the data block into an encrypted data block, the client logic further configured to provide the hash value to the single instance store service and to provide the encrypted data block and a key identifier (ID) associated with the encrypted data block to the single instance store service, the key ID indexing decryption information in a client-side data store maintained only at the client,
   the client-side data store being coupled to the client-side logic located at the client and maintaining the decryption information, the decryption information including information by which the data block is capable of being decrypted by the client given the key ID.

6. The system of claim 5 wherein the client-side data store decryption information comprises a key referenced by the key ID.

7. The system of claim 5 wherein the key ID also indexes a type of encryption used to encrypt the data block.

8. The system of claim 5 wherein the client logic provides the encrypted data block to the single instance store service when, in response to providing the hash value, the single instance store service indicates that the single instance store service does not already have a stored instance of the encrypted data block.

9. The system of claim 5 wherein the client logic requests that the encrypted data block be returned by the single instance store service, receives the encrypted data block and the key ID in response, uses the key ID to obtain the decryption information, and uses the decryption information to decrypt the encrypted data block.

10. The system of claim 9 wherein the key ID is encrypted, and wherein the client logic decrypts the key ID to obtain the key ID.

11. The system of claim 9 wherein the key ID is encrypted, and wherein the client logic provides the single instance store service with additional information that is useable by the client to decrypt the context information.

12. The system of claim 5 wherein the single instance store service comprises a data backup service.

13. The system of claim 12 wherein the client logic is incorporated into a client service that is coupled to a plurality of data sources to backup data for those data sources and to restore data to at least one of those data sources.

14. A computer-readable storage device having computer-executable instructions, which when executed perform steps, comprising:
   computing a hash value corresponding to an unencrypted data block located at a client;
   communicating the hash value to a single instance storage service located at a server; and
   receiving information at the client indicating whether the single instance storage service has an instance of the data block stored therewith based on the hash value, and if not, encrypting, at the client, the data block as encrypted data, providing the encrypted data to the single instance storage service, and providing a key identifier (ID) to the single instance storage service that indexes decryption information maintained in a data store located only at the client for decrypting the encrypted data without enabling the single instance storage service to decrypt the encrypted data.

15. The computer-readable storage device of claim 14 wherein providing the encrypted data and providing the key ID comprises packaging the encrypted data and the key ID into a package communicated to the single instance storage service.

16. The computer-readable storage device of claim 14 having further computer-executable instructions, comprising, encrypting the key ID.

17. The computer-readable storage device of claim 14 having further computer-executable instructions, comprising requesting that the encrypted data block be returned by the single instance store service, receiving the encrypted data block and key ID in response, and using the key ID to decrypt the encrypted data block.

18. The computer-readable storage device of claim 17 wherein requesting that the encrypted data block be returned by the single instance store service comprises providing the hash value, and wherein using the key ID to decrypt the encrypted data block comprises accessing a decryption key maintained in association with the key ID.

19. The computer-readable storage device of claim 14 wherein the decryption information maintained at the client comprises a data block encryption key used to encrypt the data block.

20. The computer-readable storage device of claim 19 wherein the decryption information also includes a type of encryption used to encrypt the data block.

* * * * *